(12) United States Patent
Kataoka

(10) Patent No.: US 9,796,260 B2
(45) Date of Patent: Oct. 24, 2017

(54) FUEL TANK

(71) Applicant: TOYOTA JIDOSHA KABUSHIKI KAISHA, Toyota-shi (JP)

(72) Inventor: Chiaki Kataoka, Nagakute (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/880,628

(22) Filed: Oct. 12, 2015

(65) Prior Publication Data
US 2016/0107520 A1 Apr. 21, 2016

(30) Foreign Application Priority Data

Oct. 17, 2014 (JP) .................................. 2014-213135

(51) Int. Cl.
*B60K 15/03* (2006.01)
*B60K 15/077* (2006.01)

(52) U.S. Cl.
CPC ...... *B60K 15/03177* (2013.01); *B60K 15/077* (2013.01); *B60K 2015/03111* (2013.01); *B60K 2015/03453* (2013.01); *B60K 2015/0777* (2013.01)

(58) Field of Classification Search
CPC .. B60K 2015/03453; B60K 2015/0777; B60K 2015/03111; B60K 15/03177
See application file for complete search history.

(56) References Cited

U.S. PATENT DOCUMENTS

| 2002/0017745 | A1 | 2/2002 | Vorenkamp et al. |
| 2002/0020487 | A1 | 2/2002 | Vorenkamp et al. |
| 2002/0020705 | A1 | 2/2002 | Vorenkamp et al. |
| 2004/0141829 | A1* | 7/2004 | Maruyama ............ F16B 5/0208 411/437 |

(Continued)

FOREIGN PATENT DOCUMENTS

| CN | 1512081 A | 7/2004 |
| CN | 101687366 A | 3/2010 |
| JP | 2004-505812 | 2/2004 |

(Continued)

OTHER PUBLICATIONS

Chinese Office Action issued Jun. 6, 2017 for Chinese Patent Application No. 201510662969.X.

*Primary Examiner* — Stephen Castellano
(74) *Attorney, Agent, or Firm* — Oblon, McClelland, Maier & Neustadt, L.L.P.

(57) ABSTRACT

A fuel tank according to technology disclosed herein includes: a fuel tank main body that is made from resin, that stores fuel internally, and that is formed with a protruding attachment pin at a tank inner side; an in-built component installed inside the fuel tank main body; a fixed attachment portion that is provided at the in-built component, and that is fixed to the fuel tank main body; and a movable attachment portion that is provided at the in-built component, that is formed with a connecting portion formed with an attachment hole into which the attachment pin is inserted and anchored, and that is formed with a deformable portion having an end portion in the attachment hole abutting or facing the attachment pin, wherein the deformable portion is capable of expanding and contracting along an expansion and contraction direction of the fuel tank main body.

4 Claims, 11 Drawing Sheets

(56) References Cited

U.S. PATENT DOCUMENTS

2010/0212806 A1    8/2010   Lemoine et al.
2014/0117023 A1    5/2014   Ehler et al.

FOREIGN PATENT DOCUMENTS

| JP | 2004-197804 A | 7/2004 |
| --- | --- | --- |
| JP | 2010-533079 | 10/2010 |
| JP | 2011-11571 A | 1/2011 |
| JP | 2014-088172 | 5/2014 |

* cited by examiner

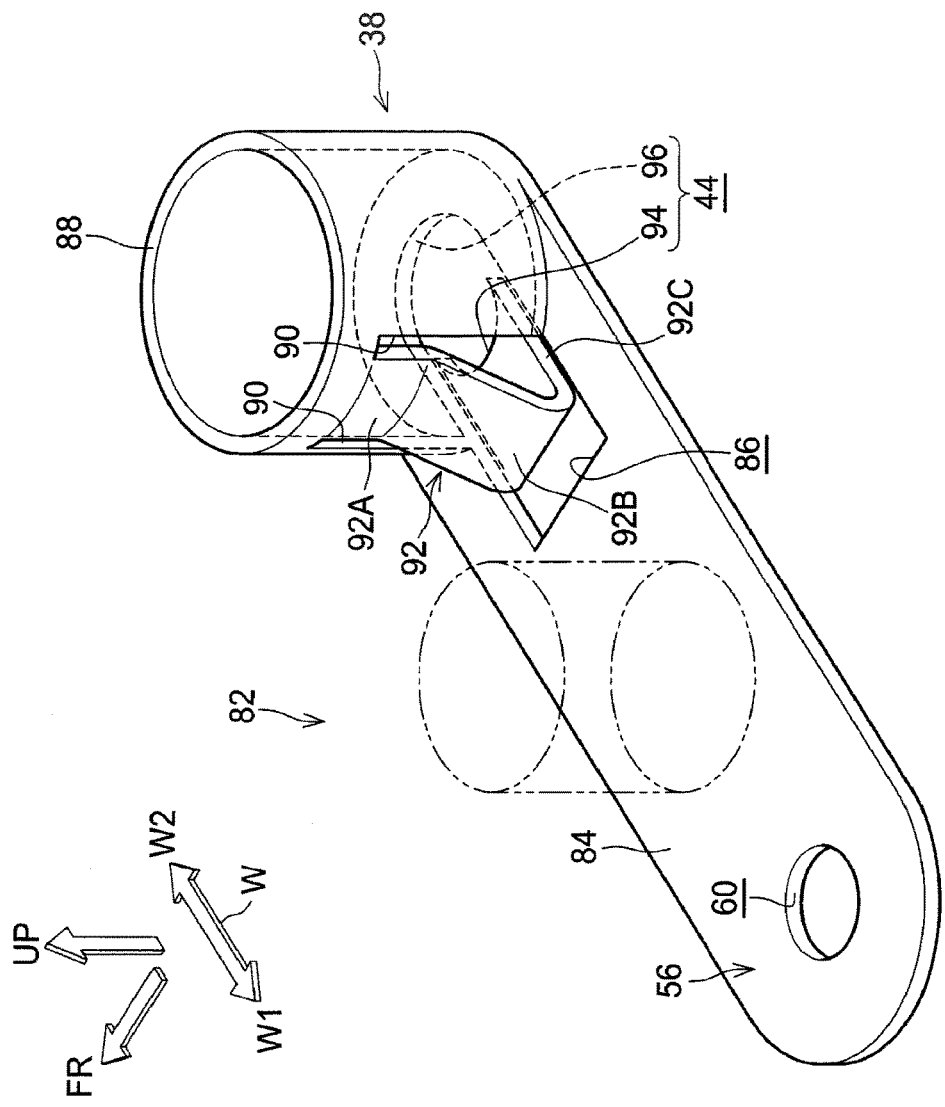

FUEL TANK

CROSS-REFERENCE TO RELATED APPLICATION

This application claims priority under 35 USC 119 from Japanese Patent Application No. 2014-213135 filed Oct. 17, 2014, the disclosure of which is incorporated by reference herein.

BACKGROUND

Technical Field

Technology disclosed herein relates to a fuel tank.

Related Art

Vehicle fuel tanks employ resin molded articles molded by blow molding or the like, due to their lightweight and moldability. In fuel tanks made from resin, in-built components are attached to a fuel tank main body in a molten state of the resin during molding. Accordingly, the fuel tank main body contracts during cooling of the molded article, stress concentration arises at attachment portions of the in-built components attached to the fuel tank due to the contraction, and there has been a concern that warping or the like may occur in the in-built components. There has also been a concern that warping or the like may also occur in in-built components when a fuel tank main body made from resin expands or contracts due to changes in atmospheric temperature or the like.

Proposals have therefore been made in which an attachment portion for fixing to a fuel tank main body is coupled to an in-built component through a tongue piece, and the tongue piece is configured deformable, such as described by Japanese National-Phase Publication No. 2010-533079, for example. This enables stress concentration to be suppressed from occurring in the attachment portion of the in-built component by deformation of the tongue piece, even when the fuel tank main body expands and contracts.

However, in the case of the technology described by Japanese National-Phase Publication No. 2010-533079, the in-built component is supported by the fuel tank main body via the tongue piece. Therefore, when vibrations are input to the in-built component from the fuel tank main body during input from a road surface, it takes time for the in-built component supported by the deformable tongue piece to attenuate the vibrations. Namely, there is room for improvement in terms of suppressing vibrations of the in-built component.

SUMMARY

The present invention provides a fuel tank that suppresses stress concentration from arising in an in-built component during expansion and contraction of a fuel tank main body, and that suppresses vibrations of the in-built component.

A fuel tank according to a first aspect of the present invention includes: a fuel tank main body that is made from resin, that stores fuel internally, and that is formed with a protruding attachment pin at a tank inner side; an in-built component installed inside the fuel tank main body; a fixed attachment portion that is provided at the in-built component, and that is fixed to the fuel tank main body; and a movable attachment portion that is provided at the in-built component, that is formed with a connecting portion formed with an attachment hole into which the attachment pin is inserted and anchored, and that is formed with a deformable portion having an end portion in the attachment hole abutting or facing the attachment pin, wherein the deformable portion is capable of expanding and contracting along an expansion and contraction direction of the fuel tank main body.

In this fuel tank, the in-built component is installed inside the fuel tank main body, and is anchored to the fuel tank main body through the movable attachment section and the fixed attachment section. In the movable attachment section, the attachment hole into which the attachment pin of the tank main body is inserted and anchored is provided at the connecting portion, the end portion in the attachment hole abuts or faces the attachment pin, and the deformable portion is provided capable of deforming along an expansion and contraction direction of the fuel tank main body. Accordingly, when the fuel tank main body that is formed from resin expands and contracts, deformation of the deformable portion that is pushed by the attachment pin enables stress concentration to be suppressed from acting on the movable attachment portion from the attachment pin.

Moreover, the in-built component is supported by the fuel tank main body through the connecting portion excluding the deformable portion at the movable attachment portion. Accordingly, vibrations are transmitted to the in-built component via the connecting portion when vibrations are input to the in-built component from the fuel tank main body during input from a road surface. Namely, since transmission of vibrations to the in-built component from the fuel tank main body does not proceed via the deformable portion that is capable of deforming, when input of vibrations from the fuel tank main body stops, vibrations of the in-built component attenuate promptly compared to an in-built component supported by a resilient body. This enables vibrations of the in-built component to be effectively suppressed.

A fuel tank according to a second aspect of the present invention is the first aspect of the present invention, wherein the deformable portion is provided on a path of relative movement of the attachment pin accompanying expansion and contraction of the fuel tank main body.

When the fuel tank main body that is made of resin expands or contracts, the attachment position of the movable attachment portion (at the attachment pin) is relatively displaced so as to withdraw from or approach the attachment position of the fixed attachment portion in the fuel tank main body. In this fuel tank, the deformable portion of the moveable attachment portion is provided on the path of movement of the attachment pin caused by expansion or contraction of the fuel tank main body that is made from resin. Accordingly, the deformable portion deforms along the displacement direction of the attachment pin when the fuel tank main body expands or contracts, enabling even more effective suppression of stress concentration from acting on the movable attachment portion from the attachment pin.

A fuel tank according to a third aspect of the present invention is the first aspect or the second aspect of the present invention, wherein the deformable portion is provided on a straight line that connects the fixed attachment portion to the attachment hole of the movable attachment portion.

When the fuel tank main body that is made of resin expands or contracts, the attachment position of the movable attachment portion (at the attachment pin) is relatively displaced so as to withdraw from or approach the attachment position of the fixed attachment portion in the fuel tank main body. Namely, the attachment pin is relatively displaced along a straight line that connects the fixed attachment portion and the movable attachment portion of the in-built component installed in the fuel tank main body. Accordingly, when a deformably movable region of the movable attachment portion is provided on the straight line that connects the fixed attachment portion and the attachment hole of the movable attachment portion, the deformable portion is deformed in the displacement direction of the attachment pin during expansion and contraction of the fuel tank main body, enabling stress concentration to be even more effectively suppressed from acting on the movable attachment portion from the attachment pin.

A fuel tank according to a fourth aspect of the present invention is any one of the first aspect to the third aspect of the present invention, wherein a gap is formed between the attachment hole and the attachment pin in at least a movement direction of the attachment pin when in a reference state of the fuel tank main body.

In this fuel tank, the gap is formed between the attachment hole and the attachment pin in at least the movement direction of the attachment pin when in the reference state of the fuel tank main body. The attachment pin first moves across the gap in the attachment hole during expansion and contraction of the fuel tank main body from the reference state as a result. Accordingly, stress does not act on the movable attachment portion during movement of the attachment pin within the gap. Due to the above, stress concentration is even further suppressed from acting on the movable attachment portion from the attachment pin during expansion and contraction of the fuel tank main body.

A fuel tank according to a fifth aspect of the present invention is any one of the first aspect to the fourth aspect of the present invention, wherein the connecting portion is a rigid body.

In this fuel tank, the connecting portion that configures the movable attachment portion is formed from a rigid body. The in-built component is supported by the fuel tank main body through the connecting portion. Accordingly, vibrations are transmitted through the connecting portion that is a rigid body during input of vibrations from the fuel tank main body to the in-built component. As a result, when input of vibrations from the fuel tank main body stops, vibrations of the in-built component promptly attenuate compared to an in-built component supported by a resilient body. Namely, the vibrations of the in-built component are even further suppressed.

The fuel tank according to the first aspect of the present invention enables stress concentration to be suppressed from acting on the movable attachment portion from the fuel tank main body, and therefore the in-built component, during expansion and contraction of the resin, and enables vibrations of the in-built component to be suppressed, due to having the above configuration.

The fuel tank according to any one out of the second aspect to the fourth aspect of the present invention enables stress concentration to be even more effectively suppressed from acting on the movable attachment portion from the fuel tank main body, and therefore the in-built component, due to having the above configuration.

The fuel tank according to the fifth aspect of the present invention enables vibrations of the in-built component to be even further suppressed due to having the above configuration.

BRIEF DESCRIPTION OF THE DRAWINGS

Exemplary embodiments of the present invention will be described in detail based on the following figures, wherein:

FIG. 5 is a perspective view of an in-built component according to a second exemplary embodiment of technology disclosed herein;

DETAILED DESCRIPTION

First Exemplary Embodiment

Explanation follows regarding a fuel tank according to a first exemplary embodiment of technology disclosed herein, with reference to FIG. 1 to FIG. 4. In each of the drawings, a vehicle upward direction is indicated by the arrow UP, a vehicle width direction is indicated by the arrow W, and a vehicle forward direction is indicated by the arrow FR.

Figure 1:
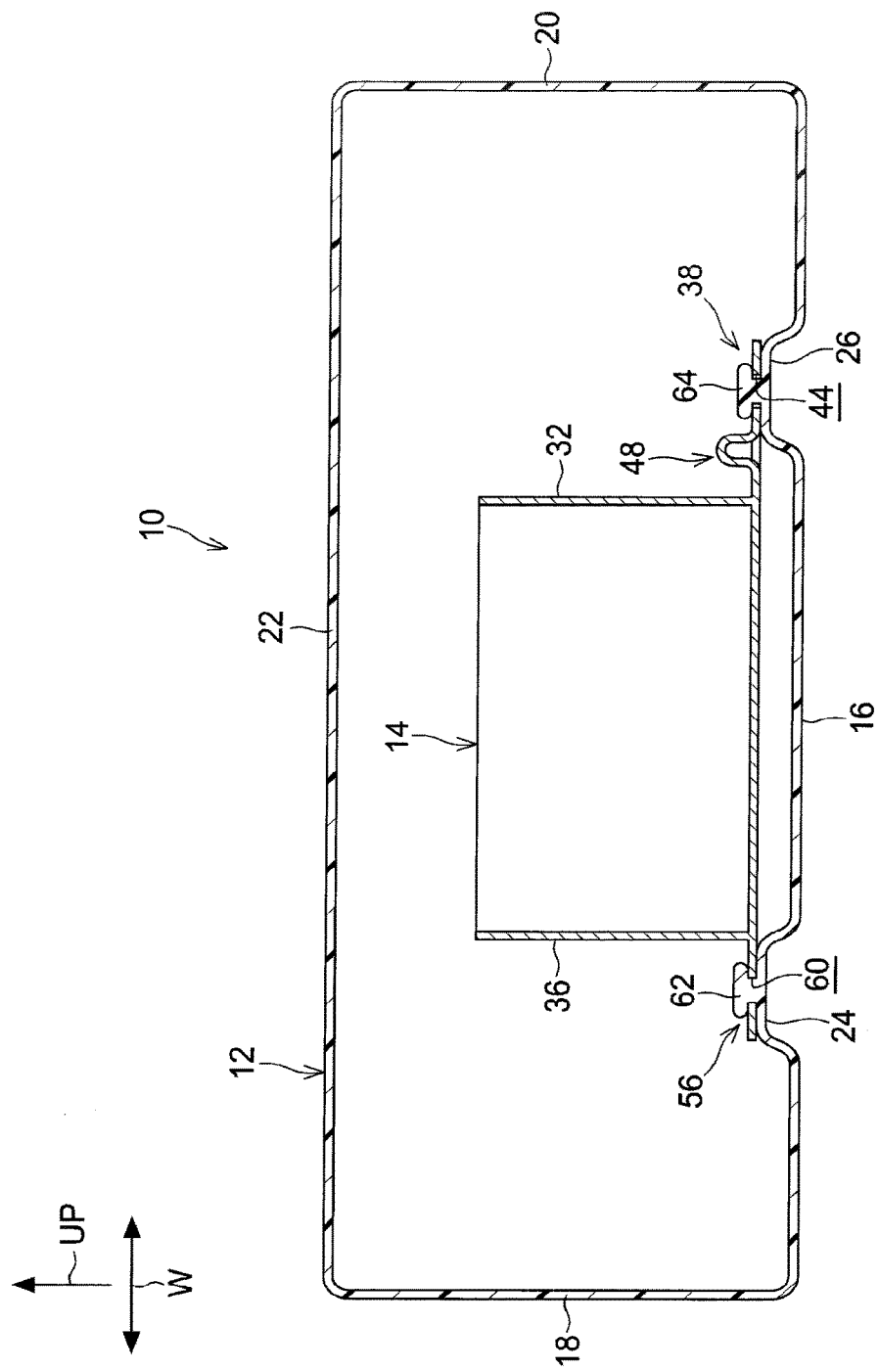
FIG. 1 is a schematic vertical cross-section of a fuel tank according to a first exemplary embodiment of technology disclosed herein.

First, overall explanation follows regarding a fuel tank 10, with reference to FIG. 1. As illustrated in FIG. 1, the fuel tank 10 includes a fuel tank main body 12 that stores fuel internally, and an in-built component 14 installed inside the fuel tank main body 12.

As illustrated in FIG. 1, the fuel tank main body 12 includes a bottom face 16, side faces 18, 20, and a top face 22. Support platforms 24, 26 formed protruding upward are provided at the bottom face 16 in two places. A fixed attachment portion 56 and a movable attachment portion 38 of the in-built component 14, described below, are fixed to the support platforms 24, 26 by crimping.

Figure 2:
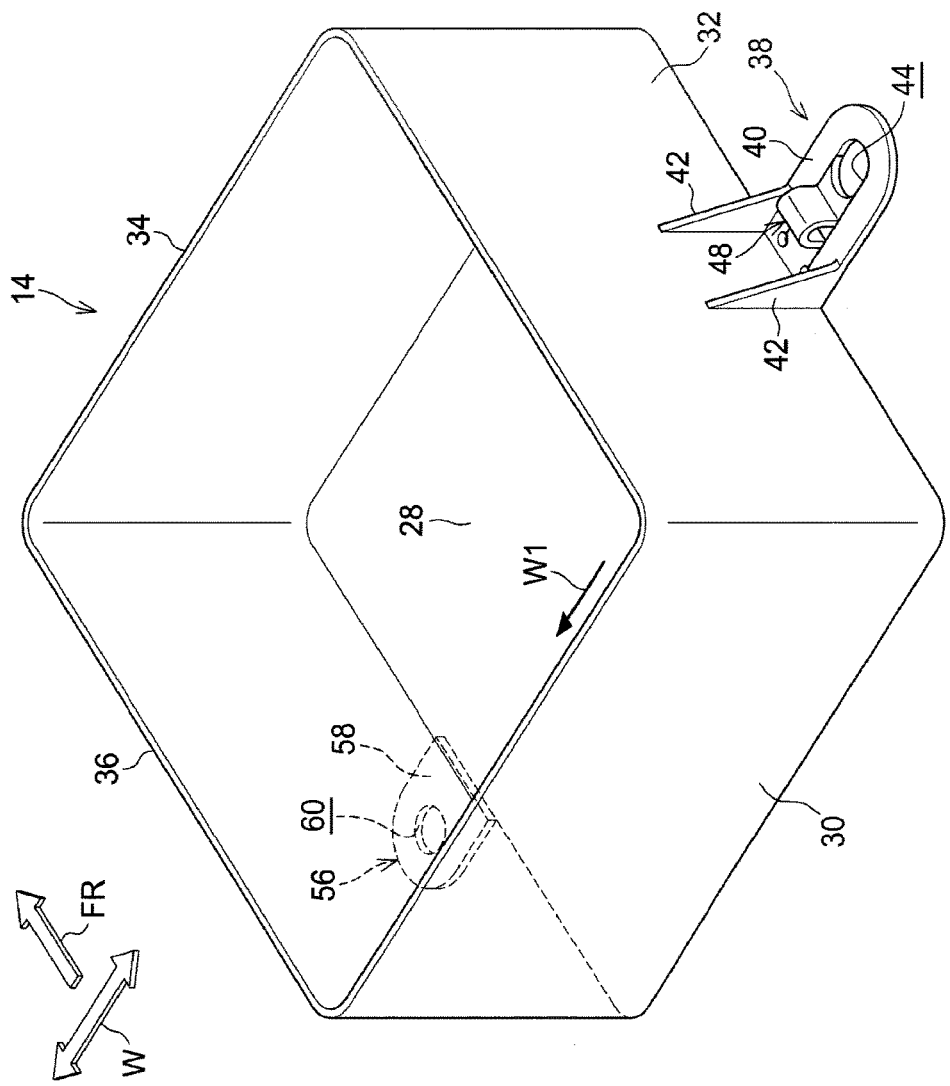
FIG. 2 is a perspective view of an in-built component according to the first exemplary embodiment of technology disclosed herein.

As illustrated in FIG. 2, the in-built component 14 is a so-called sub-tank acting to secure a liquid level of fuel sufficient to be sucked using a fuel pump when the amount of fuel has become small, and is provided with side walls 30, 32, 34, and 36 around the periphery of a rectangular bottom face 28.

The movable attachment portion 38 is formed protruding from an outside face of the side wall 32. The movable attachment portion 38 extends toward the outside direction from a lower end portion of the side wall 32, and is provided with a support plate 40 having a semicircular distal end, and a pair of ribs 42 that connect the support plate 40 to the side wall 32 at both sides of the support plate 40.

Figure 3:
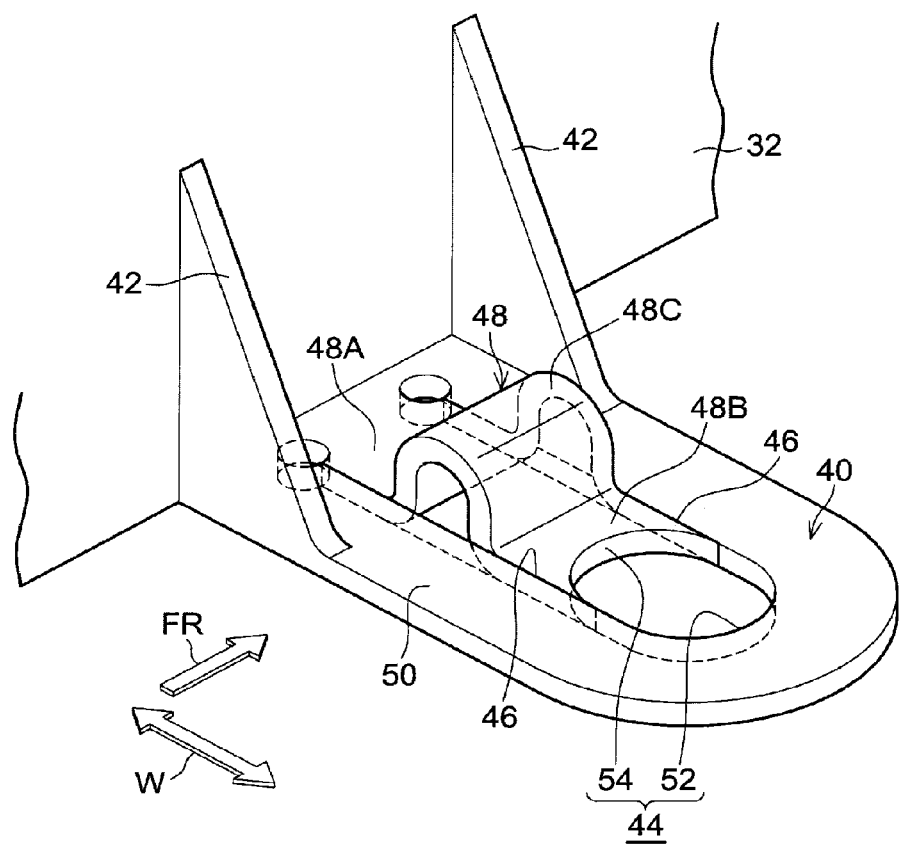
FIG. 3 is a perspective view of a movable attachment portion according to the first exemplary embodiment of technology disclosed herein.

An oval shaped hole 44 having its length direction along the arrow W direction (an example of an attachment hole according to technology disclosed herein) is formed at a distal end side of the support plate 40. As illustrated in FIG. 3, a tongue piece 48 (an example of a deformable portion according to technology disclosed herein) is formed to the support plate 40 by a pair of slits 46 extending along the arrow W direction from the side of the side wall 32 toward the hole 44. The tongue piece 48 extends from a base end portion 48A on the side wall 32 side to a distal end portion 48B that forms a portion of the hole 44, and includes a curved portion 48C that curves upward partway along the tongue piece 48. Note that in the tongue piece 48, the curved portion 48C is resiliently deformed by pressing force acting on the distal end portion 48B.

A portion of the support plate 40 excluding the tongue piece 48 configures a connecting portion 50. As illustrated in FIG. 3, the connecting portion 50 is formed in a substantial U-shape in plan view, starting from the side wall 32 and returning to the side wall 32 so as surround the tongue piece 48. An inner peripheral face 52 of the connecting portion 50 and a wall face 54 of the distal end portion 48B of the tongue piece 48 form the oval shaped hole 44. Namely, the inner peripheral face 52 of the connecting portion 50 configures a semicircular portion at the outside of the hole 44 and linear portions connected thereto, and the wall face 54 of the distal end portion 48B of the tongue piece 48 configure a semi-circular portion at the inside of the hole 44. Unlike the tongue piece 48, which undergoes resilient deformation, the connecting portion 50 is a rigid body that is not substantially deformed by load input by, for example, expansion and contraction of the fuel tank main body 12. Note that the "rigid body" of the present exemplary embodiment is not deformed by expansion and contraction of the fuel tank main body 12 or the like, but in cases in which the rigid body is made from resin, minor bending, expansion or contraction due to heat, etc. are permitted. Thus the connecting portion 50 is at least more rigid than the tongue piece 48.

As illustrated in FIG. 2, the fixed attachment portion 56 is formed protruding from the side wall 36 that is opposite to the side wall 32 of the in-built component 14. The fixed attachment portion 56 is provided extending toward the outside direction from the side wall 36, and includes a support plate 58 having a semicircular distal end. A circular hole 60 is formed to the distal end side of the support plate 58. The fixed attachment portion 56 is formed positioned so as to have line symmetry with the movable attachment portion 38 in the in-built component 14. The hole 44 of the movable attachment portion 38 and the hole 60 of the fixed attachment portion 56 are thereby formed on a straight line in the arrow W direction.

Figure 4A:
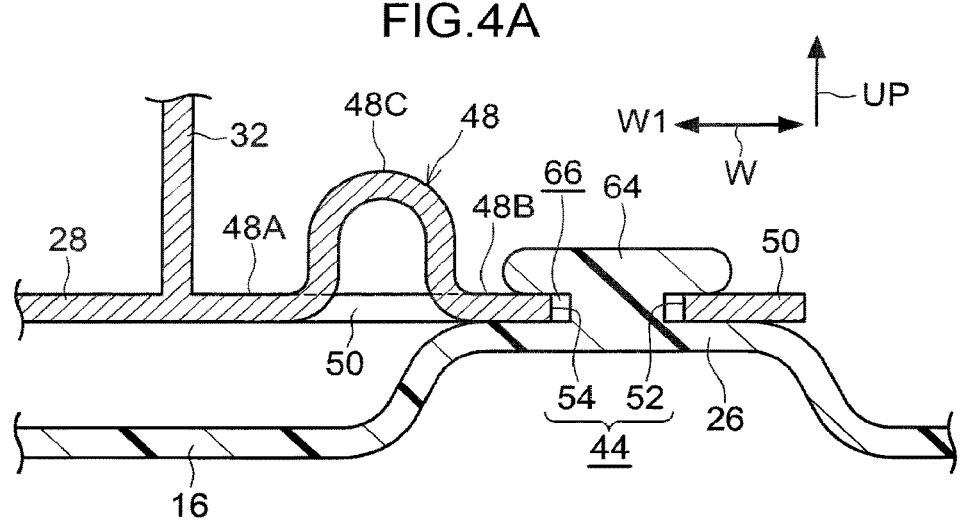
FIG. 4A is a vertical cross-section illustrating an attached state before movement of a protruding portion, in an attached state of the movable attachment portion according to the first exemplary embodiment of technology disclosed herein.
Figure 4B:
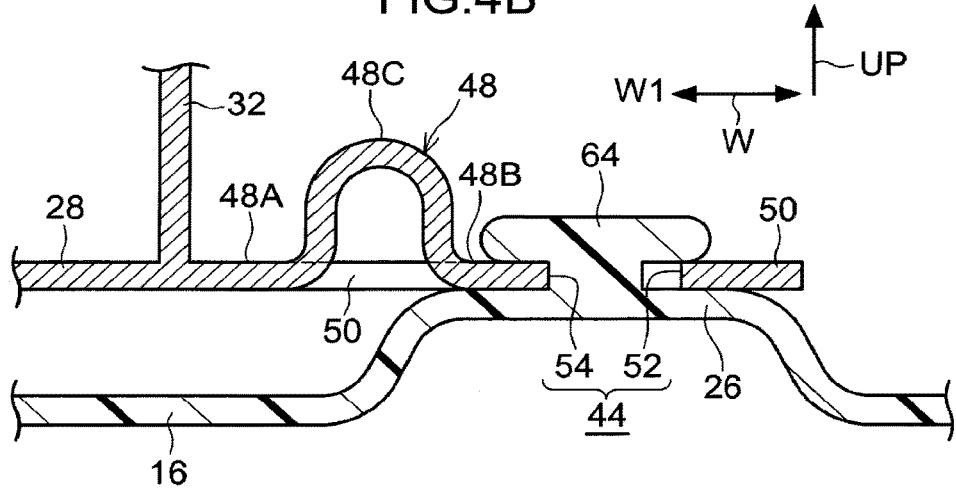
FIG. 4B is a vertical cross-section illustrating an attached state during movement of a protruding portion within a gap, in an attached state of the movable attachment portion according to the first exemplary embodiment of technology disclosed herein.
Figure 4C:
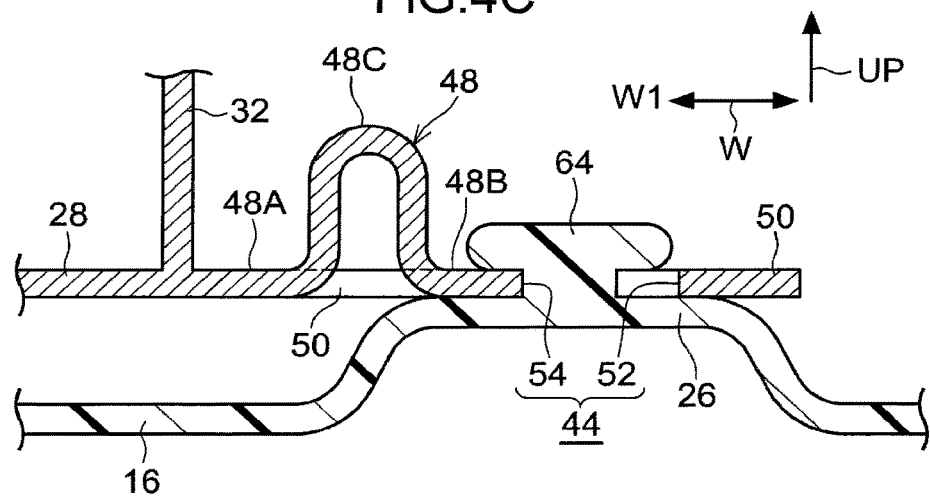
FIG. 4C is a vertical cross-section illustrating an attached state in a spring deformation state accompanying movement of a protruding portion, in an attached state of the movable attachment portion according to the first exemplary embodiment of technology disclosed herein.

As illustrated in FIG. 1, protruding portions 62, 64 formed protruding upward from the support platforms 24, 26 of the fuel tank main body 12 are inserted during resin molding into the thus formed hole 60 of the fixed attachment portion 56 and hole 44 of the movable attachment portion 38, and head portions of the protruding portions 62, 64 are crushed by crimping. The fixed attachment portion 56 and the movable attachment portion 38 of the in-built component 14 are thereby anchored to the support platforms 24, 26. However, as illustrated in FIG. 4A, a gap 66 in the arrow W direction is formed between the hole 44 and the protruding portion 64 (an example of an attachment pin according to technology disclosed herein) when the fuel tank main body 12 is in a reference state, since the hole 44 is an oval, in contrast to the circular hole 60. Herein, "reference state of the fuel tank main body 12" refers to a state of the fuel tank main body 12 in which there is reference expansion/contraction. The time of attachment of the in-built component 14 during manufacture (molding) of the fuel tank 10 is taken as the reference state herein since the contraction that occurs during resin molding is the relevant matter.

Explanation follows regarding operation of the fuel tank 10 that is formed in this manner.

The in-built component 14 is installed inside the fuel tank main body 12 during resin molding of the fuel tank 10. The fixed attachment portion 56 and the movable attachment portion 38 of the in-built component 14 are fixed by crimping to the support platforms 24, 26 of the bottom face 16 of the fuel tank main body 12 at this time.

The bottom face 16 that configures the fuel tank main body 12 contracts as a result of the molded article cooling. The support platform 26 is thereby relatively displaced in a direction to approach the support platform 24 (an arrow W1 direction). The protruding portion 64 thereby moves toward the support platform 24 side within the hole 44. When this occurs, as illustrated by the change from FIG. 4A to FIG. 4B, the protruding portion 64 first moves toward the support platform 24 side across the gap 66 within the hole 44 (in the arrow W1 direction). Stress does not act on the movable attachment portion 38 from the protruding portion 64 at this time since the protruding portion 64 only moves within the gap 66.

The protruding portion 64 pushes the distal end portion 48B of the tongue piece 48 in the arrow W1 direction when the amount of relative displacement of the support platform 26 exceeds the W direction distance of the gap 66. As illustrated by the change from FIG. 4B to FIG. 4C, as a result the tongue piece 48 is biased toward the side wall 32 side (toward the arrow W1 direction) by this pushing force, and displacement of the support platform 26 is permitted by resilient deformation of the curved portion 48C.

Thus, the fuel tank 10 has a structure in which a gap 66 is formed along the direction of relative displacement of the protruding portion 64 (the arrow W1 direction) between the hole 44 of the movable attachment portion 38 and the protruding portion 64 of the fuel tank main body 12, and displacement of the protruding portion 64 (the support platform 26) relative to the support platform 24 is permitted due to the resilient deformation of the tongue piece 48. This enables stress concentration to be suppressed from acting on the movable attachment portion 38 (the in-built component 14) from the protruding portion 64 during resin cooling, and enables warping and the like in the in-built component 14 to be suppressed.

Moreover, since the movable attachment portion 38 and the fixed attachment portion 56 are formed on a straight line in the arrow W direction in plan view, the direction in which the support platform 26 approaches the support platform 24, and the direction in which the tongue piece 48 is deformed, are aligned with the arrow W1 direction when contracting during molding. This enables stress concentration from the fuel tank main body 12 to be more efficiently suppressed from acting on the movable attachment portion 38.

The in-built component 14 is installed on the support platforms 24, 26 that are formed protruding upward from the bottom face 16 of the fuel tank main body 12, via the movable attachment portion 38 and the fixed attachment portion 56. The connecting portion 50 excluding the tongue piece 48 is formed to the support plate 40 of the movable attachment portion 38. The connecting portion 50 configures a portion of the hole 44, is crimped together with the protruding portion 64 at the distal end side, and extends to the side wall 32. The connecting portion 50 is thereby configured capable of securely supporting the load of the in-built component 14.

The tongue piece 48 that suppresses stress concentration acting on the in-built component 14 accompanying contraction during resin molding does not need to support the load of the in-built component 14, and may be reduced in scale to a great extent.

The in-built component 14 is supported by the fuel tank main body 12 through the connecting portion 50 that is the rigid body of the support plate 40 of the movable attachment portion 38 excluding the resiliently deforming tongue piece 48. Accordingly, when vibrations are input to the in-built component 14 from the fuel tank main body 12 during input from the road surface, vibrations of the in-built component 14 promptly attenuate when input of vibrations from the fuel tank main body 12 stops, compared to an in-built component supported by a resilient body. Namely, vibrations of the in-built component 14 can be suppressed.

Although a single fixed attachment portion 56 is provided at the in-built component 14 in the fuel tank 10 of the present exemplary embodiment, provision of two is conceivable. In such cases, the tongue piece 48 is preferably provided extending along a straight line that connects the center points of the two fixed attachment portions 56 to the movable attachment portion 38 (the center of the hole 44). This is because relative movement of the support platform 26 (the protruding portion 64) along the straight line (the straight line being the movement path of the protruding portion 64) enables stress concentration to be most efficiently suppressed from acting on the movable attachment portion 38.

Although explanation has been given regarding the fuel tank main body 12 during cooling (during contraction) in the present exemplary embodiment, configuration may be made such that similar operation and advantageous effects are also exhibited during expansion of the fuel tank main body 12. Namely, stress concentration can be suppressed from acting on the in-built component 14 during expansion of the fuel tank main body 12 (resin) by providing a tongue piece 48 at the opposite side of the hole 44 from that in the present exemplary embodiment.

Second Exemplary Embodiment

Figure 6A:
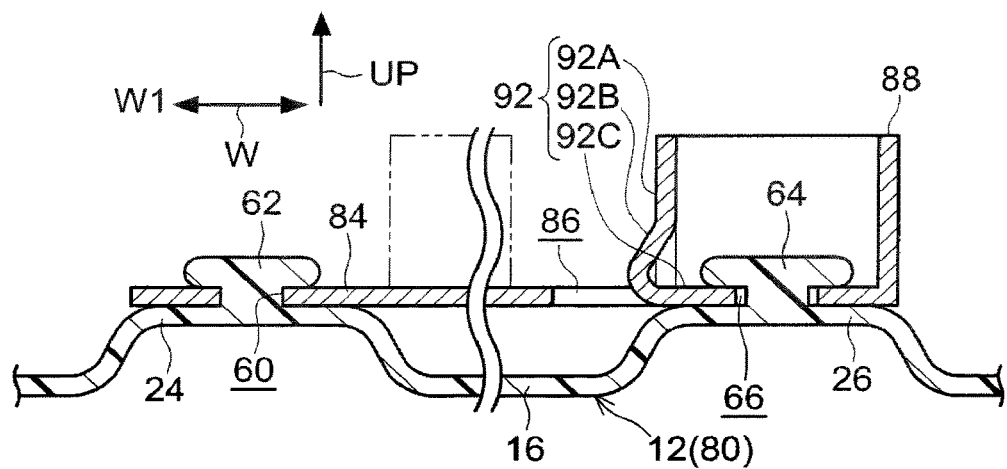
FIG. 6A is a vertical cross-section illustrating an attached state before movement of a protruding portion, in an attached state of a movable attachment portion according to the second exemplary embodiment of technology disclosed herein.
Figure 6B:
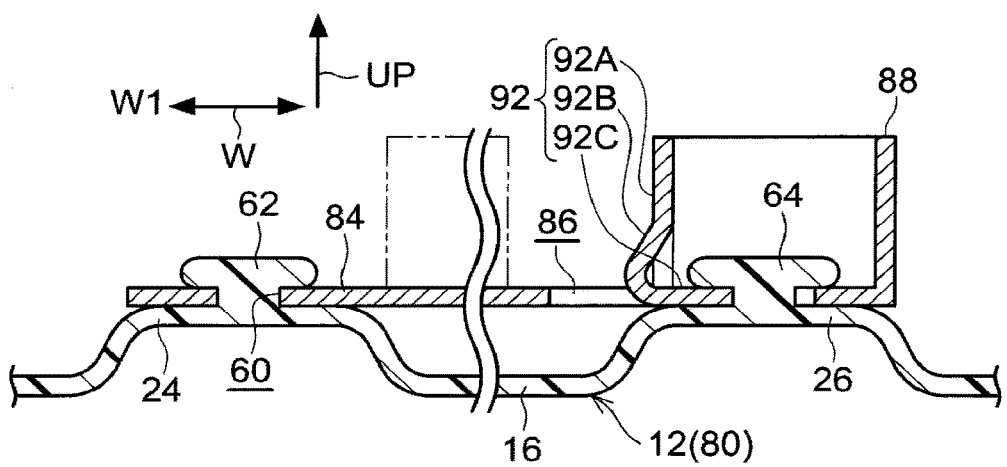
FIG. 6B is a vertical cross-section illustrating an attached state during movement of a protruding portion within a gap, in an attached state of a movable attachment portion according to the second exemplary embodiment of technology disclosed herein.
Figure 6C:
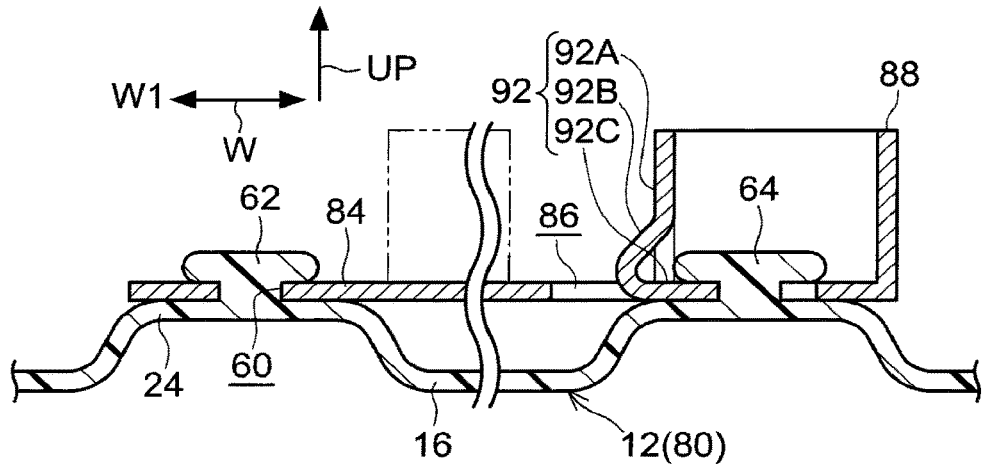
FIG. 6C is a vertical cross-section illustrating an attached state in a spring deformation state accompanying movement of a protruding portion, in an attached state of a movable attachment portion according to the second exemplary embodiment of technology disclosed herein.

Explanation follows regarding a fuel tank according to a second exemplary embodiment of technology disclosed herein, with reference to FIG. 5 and FIG. 6. Note that configuration elements similar to those of the first exemplary embodiment are allocated the same reference numerals, and detailed explanation thereof is omitted.

First, explanation follows regarding an in-built component 82 installed inside a fuel tank 80. As illustrated in FIG. 5, the in-built component 82 includes a substantially rectangular base plate 84 having two semicircular end portions. A hole 60 is formed at one end side of the base plate 84, and the hole 60 functions as a fixed attachment portion 56 that is fixed to a support platform 24 by inserting a protruding portion 62, protruding from a support platform 24 of the fuel tank main body 12, into the hole 60 and crimping. Note that the base plate 84 is a rigid body similar to that of the first exemplary embodiment.

As illustrated in FIG. 5, a substantially rectangular hole 86 having a semicircular distal end side, and a cylindrically shaped cylindrical portion 88 that extends upward above the base plate 84, are formed at the other end side of the base plate 84. A pair of slits 90 are formed to the cylindrical portion 88 at a position at an upper portion of the hole 86, and a portion separated from the cylindrical portion 88 by the slits 90 configures a tongue piece 92 (an example of a deformable portion of technology disclosed herein).

The tongue piece 92 includes a vertical wall portion 92A that extends downward from a base end portion, an inclined wall portion 92B inclined from a lower end of the vertical wall portion 92A toward the outside, and a horizontal wall portion 92C extending, from a lower end of the inclined wall portion 92B, inside the hole 86 toward the other end side so as to be parallel to the base plate 84. A semicircular recessed portion 94 is formed to a distal end (the other end side) of the horizontal wall portion 92C, forming an oval shaped hole 44, together with a substantially semicircular inner peripheral face 96 at a distal end side of the hole 86. Note that a protruding portion 64 of the support platform 26 is inserted into the hole 44 and crimped, thereby functioning as a movable attachment portion 38 fixed to the support platform 26.

Explanation follows regarding operation the fuel tank 80 configured in this manner.

As illustrated in FIG. 6, the support platform 26 moves relatively in the direction to approach the support platform 24 (the arrow W1 direction) due to the fuel tank main body 12 cooling during resin molding. The hole 44 is accordingly configured in an oval shape having its length direction along the direction that connects the support platform 24 to the support platform 26 (the arrow W direction). Thus, as illustrated in FIG. 6A, a gap 66 is formed in the arrow W direction between the hole 44 and the protruding portion 64 when the fuel tank main body 12 is in the reference state. As illustrated by the change from FIG. 6A to FIG. 6B, the protruding portion 64 moves within the gap 66 when the support platform 26 is relatively displaced in the direction to approach the support platform 24. At this time, stress from the protruding portion 64 does not act on the base plate 84.

Moreover, when the support platform 26 (the protruding portion 64) is relatively displaced by the distance of the gap 66 or more, the tongue piece 92 deforms and permits the displacement of the support platform 26. Namely, the protruding portion 64 abuts the recessed portion 94 of the horizontal wall portion 92C of the tongue piece 92, and is biased in the arrow W1 direction. The inclination angle of the inclined wall portion 92B of the tongue piece 92 is increased by this biasing force, and the horizontal wall portion 92C is moved in the arrow W1 direction. Stress concentration can thereby be suppressed from acting on the base plate 84 from the protruding portion 64.

The in-built component 82 is supported by the support platform 26 through the base plate 84 excluding the tongue piece 92. Namely, there is no necessity for the tongue piece 92, which suppresses stress concentration, to support the load of the in-built component 82, enabling a reduction in scale.

Moreover, the in-built component 82 is supported by the fuel tank main body 12 through the base plate 84 excluding the resiliently deforming tongue piece 92. Vibrations input to the in-built component 82 from the fuel tank main body 12 during input from the road surface are transmitted via the base plate 84 that is a rigid body. As a result, the vibrations of the in-built component 82 promptly attenuate when input of vibrations from the fuel tank main body 12 stops, compared to in-built components supported by resilient bodies. Namely, vibrations of the in-built component 82 can be suppressed.

REFERENCE EXAMPLE

Explanation follows regarding a fuel tank according to a reference example, with reference to FIG. 7 to FIG. 11. Configuration elements similar to those of the first exemplary embodiment are allocated the same reference numerals, and detailed explanation thereof is omitted.

A fuel tank 100 of the present reference example includes two movable attachment portions 102, 104 for an in-built component 14.

Figure 7:
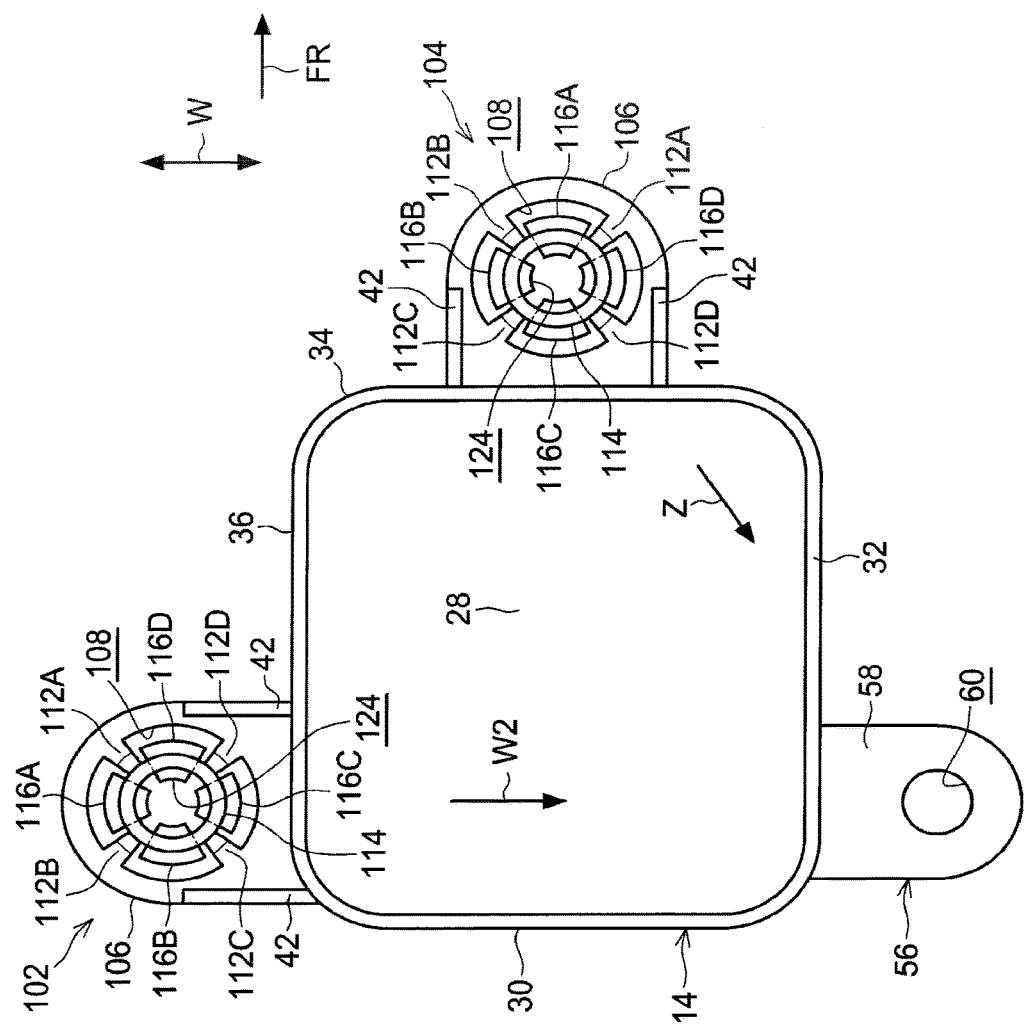
FIG. 7 is a plan view of an in-built component according to a reference example.

More specifically, as illustrated in FIG. 7, a fixed attachment portion 56 is provided at a side wall 32 of the in-built component 14, and movable attachment portions 102, 104 are respectively provided at side walls 36, 34 of the in-built component 14.

Figure 8:
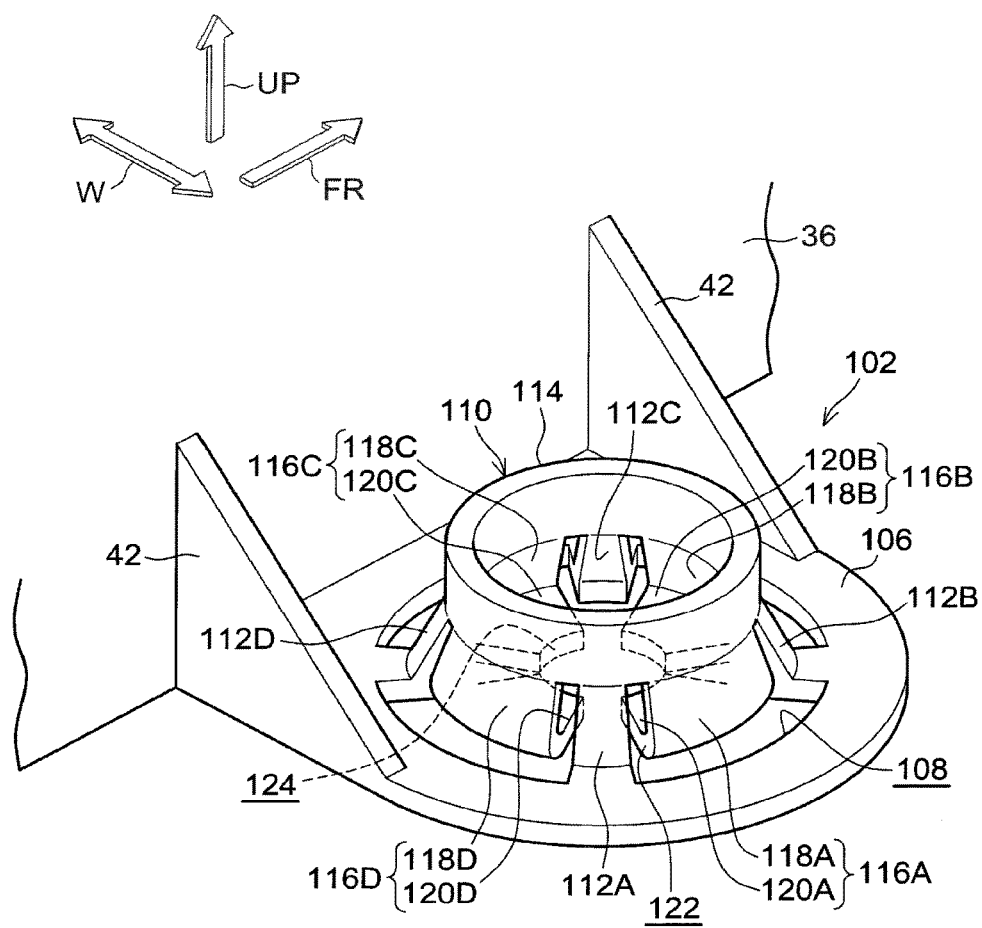
FIG. 8 is a perspective view of a movable attachment portion according to a reference example.
Figure 9:
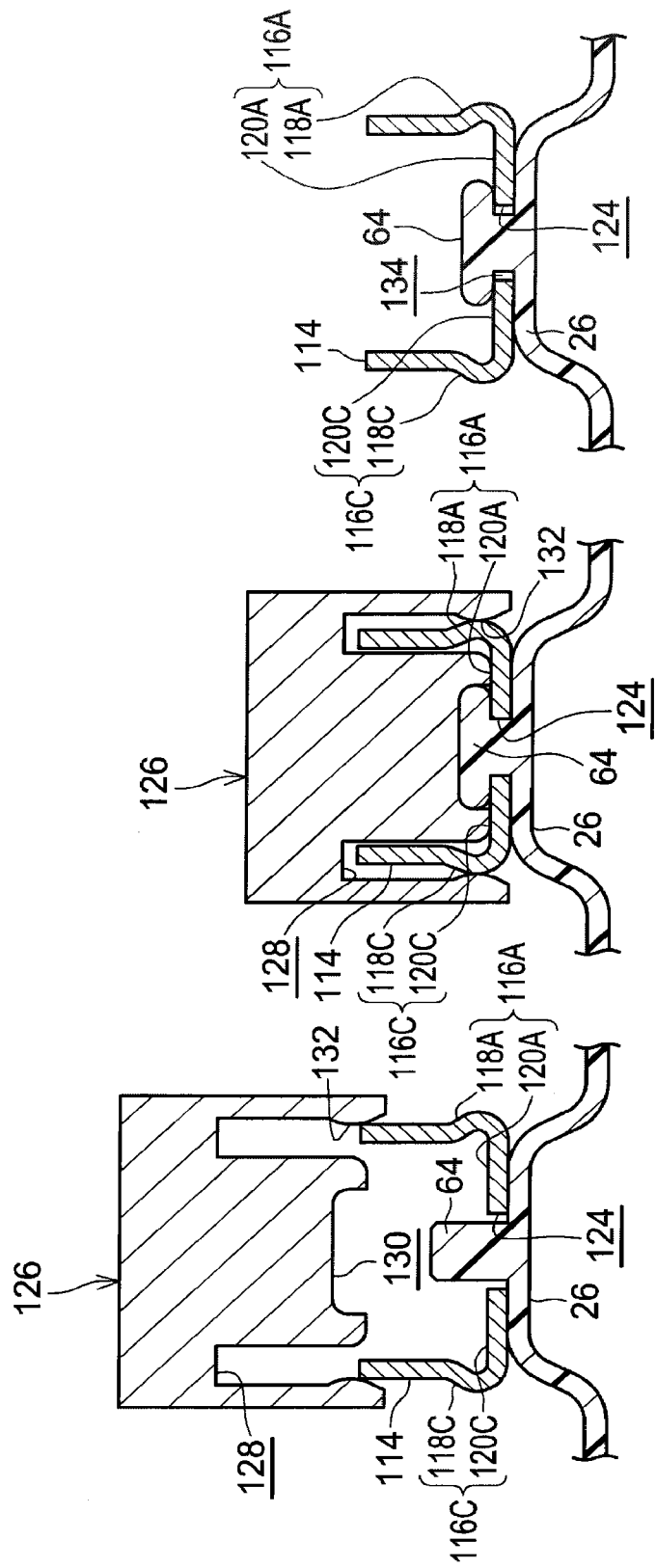
FIG. 9A is a vertical cross-section explaining crimping of a movable attachment portion according to a reference example, and is a vertical cross-section prior to crimping.
FIG. 9B is a vertical cross-section explaining crimping of a movable attachment portion according to a reference example, and is a vertical cross-section during crimping.
FIG. 9C is a vertical cross-section explaining crimping of a movable attachment portion according to a reference example, and is a vertical cross-section after crimping.
Figure 10:
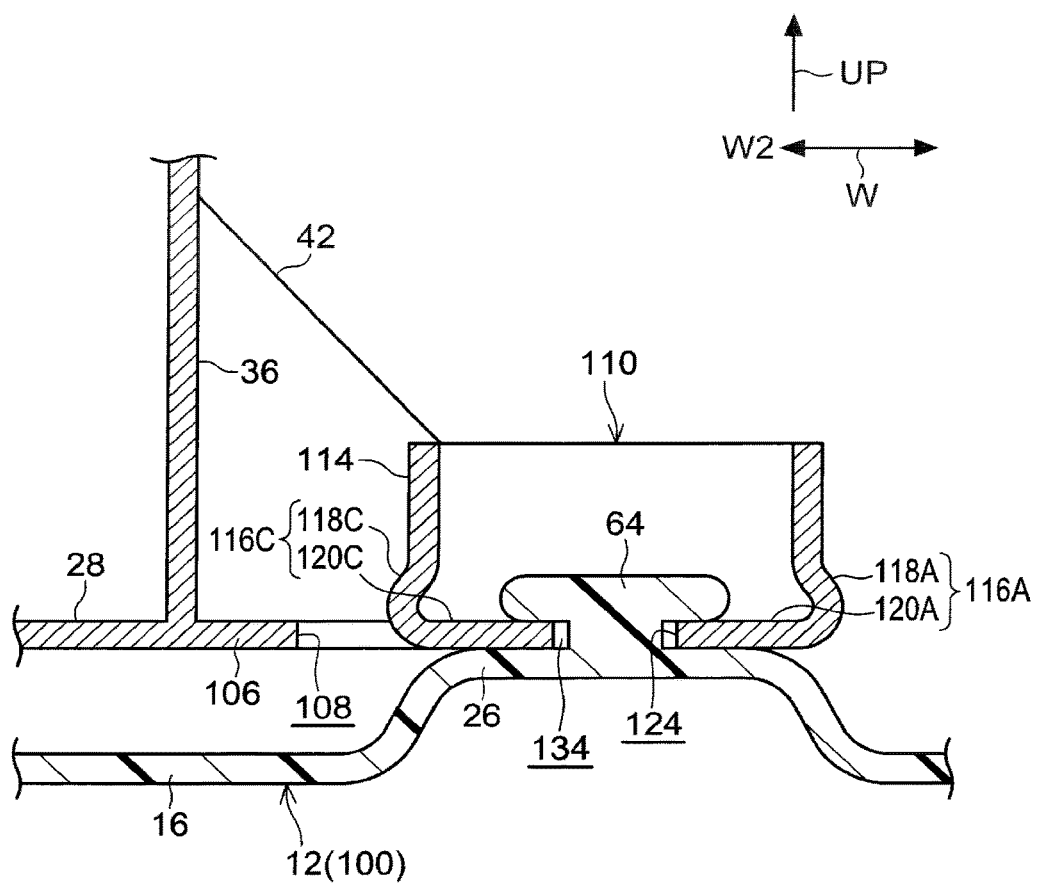
FIG. 10 is a vertical cross-section illustrating an attached state of a movable attachment portion according to a reference example.

As illustrated in FIG. 8, the movable attachment portion 102 includes a support plate 106 that has a distal end configuring a semicircular arc formed protruding from the side wall 36 and that is substantially U-shaped in plan view, a spring portion 110 formed inside a circular hole 108 formed on the distal end side of the support plate 106, and a pair of ribs 42 that connect the support plate 106 and the side wall 36 together.

The spring portion 110 includes four support portions 112A to 112D that extend from a side wall of the hole 108 toward the radial direction inside and extend diagonally upward partway along, a cylindrical base portion 114 that is supported by the support portions 112A to 112D, and four tongue pieces 116A to 116D that are formed below the base portion 114.

At a lower end of the base portion 114, the four tongue pieces 116A to 116D include inclined faces 118A to 118D provided inclining from between the adjacent support portions 112A to 112D toward the radial direction outside, and anchoring faces 120A to 120D extending from lower ends of the inclined faces 118A to 118D toward the radial direction inside at the same height as the support plate 106.

As illustrated in FIG. 7 and FIG. 8, the tongue pieces 116A to 116D substantially form four quarters of a circle in plan view, and the support portions 112A to 112D are formed between adjacent springs. Gaps 122 are formed between the tongue pieces 116A to 116D and the support portions 112A to 112D, and a hole 124 for crimping is formed in the center, surrounded by the anchoring faces 120A to 120D.

The movable attachment portion 102 is fixed to a support platform 26 of the fuel tank 100 by crimping using such tongue pieces 116A to 116D.

Explanation follows regarding crimping of the movable attachment portion 102.

As illustrated in FIG. 9A, FIG. 9B, and FIG. 9C, a crimping jig 126 is lowered in a state in which a protruding portion 64 formed protruding from the support platform 26 is inserted through the hole 124 formed in the center of the tongue pieces 116A to 116D. A groove 128 forming a circle and a crimping indentation 130 are formed to a bottom face of the crimping jig 126. Thus, lowering the crimping jig 126 over the movable attachment portion 102 causes the base portion 114 and the tongue pieces 116A to 116D to be guided inside the groove 128, and causes a head portion of the protruding portion 64 to be deformed by pressing with the crimping indentation 130 and assume a crushed (radially expanded) shape. Crimping is thereby performed, and the movable attachment portion 102 is anchored to the support platform 26 of the fuel tank main body 12 (see FIG. 9B).

A protuberance 132 protruding to the radial direction inside is formed at a lower end of a radial direction outside face of the groove 128. Thus, when the tongue pieces 116A to 116D are guided inside the groove 128, the protuberance 132 pushes the inclined faces 118A to 118D of the tongue pieces 116A to 116D to the radial direction inside, and the anchoring faces 120A to 120D abut the protruding portion 64 of the support platform 26 (see FIG. 9B). When the crimping jig 126 is subsequently removed, since the compression force toward the radial direction inside is removed, the anchoring faces 120A to 120D are moved toward the radial direction outside by the resilient force of the tongue pieces 116A to 116D, and a gap 134 is formed between the anchoring faces 120A to 120D and the protruding portion 64 (see FIG. 9C).

Note that since the movable attachment portion 104 has exactly the same configuration as the movable attachment portion 102, the same reference numerals are appended thereto, and detailed explanation thereof is omitted.

Explanation follows regarding operation of the fuel tank 100 formed in this manner.

Figure 11A:
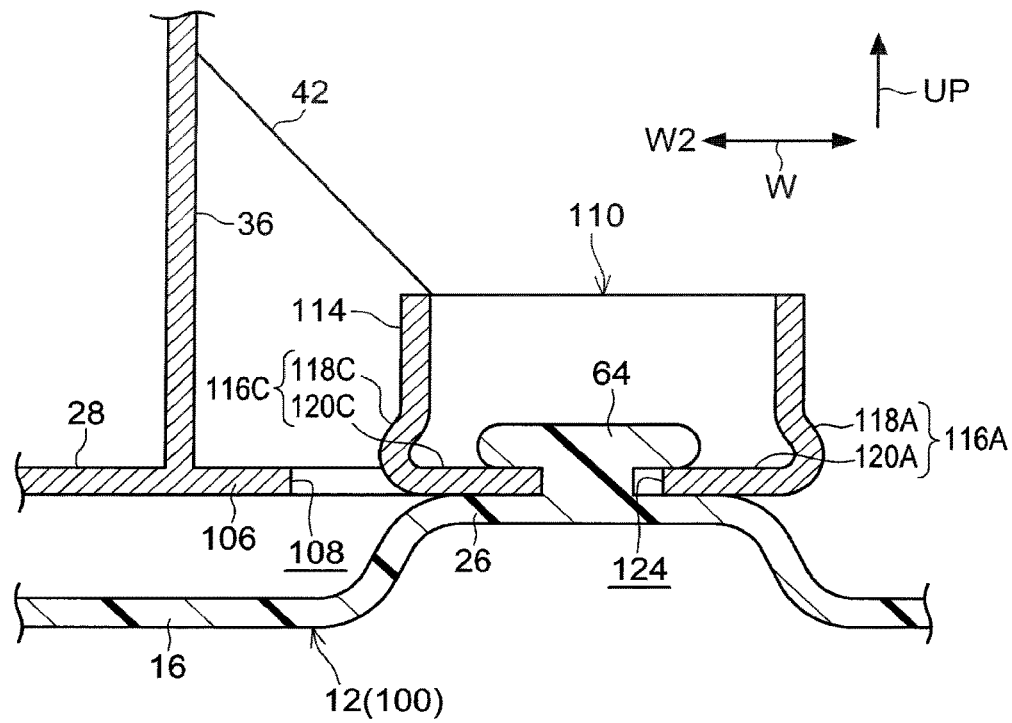
FIG. 11A is a vertical cross-section illustrating an attached state during movement of a protruding portion within a gap, in an attached state of a movable attachment portion according to a reference example.
Figure 11B:
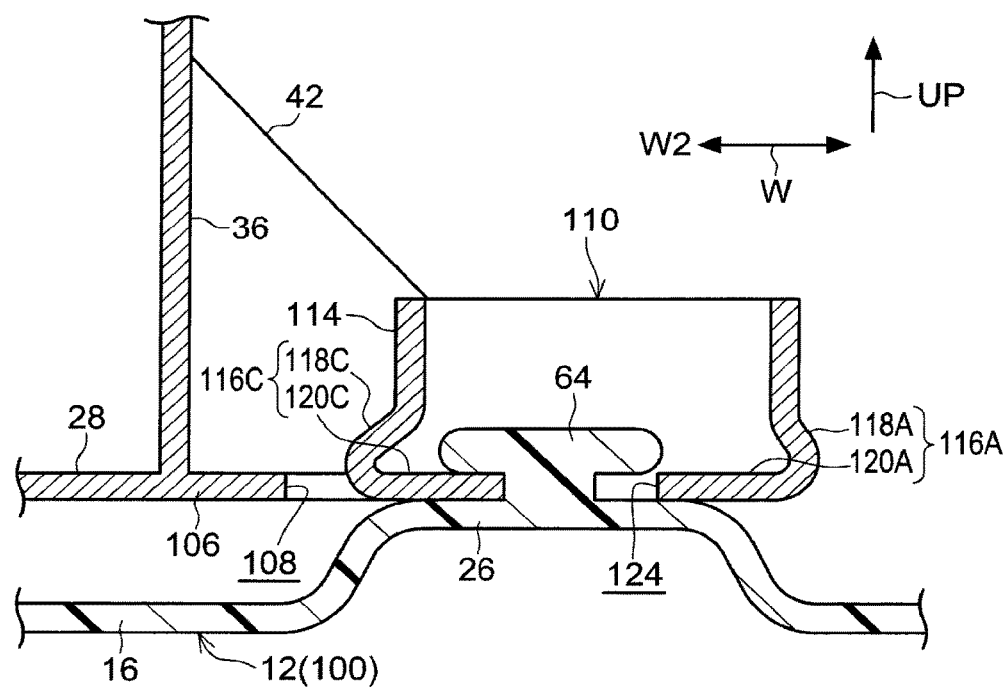
FIG. 11B is a vertical cross-section illustrating an attachment state in a spring deformation state accompanying movement of a protruding portion, in an attached state of a movable attachment portion according to a reference example.

The bottom face 16 of the fuel tank main body 12 contracts due to contraction of the fuel tank main body 12 during resin molding. As a result, the distance contracts between the support platform 24 of the fuel tank main body 12 to which the fixed attachment portion 56 of the in-built component 14 is attached, and the support platform 26 of the fuel tank main body 12 to which the movable attachment portions 102, 104 are attached. As illustrated in FIG. 7, the support platform 26 moves to the support platform 24 side (the arrow W2 direction in FIG. 7) since the movable attachment portion 102 and the fixed attachment portion 56 are disposed facing each other along the arrow W direction. As illustrated by the change from FIG. 10 to FIG. 11A, stress does not act on the in-built component 14 (the movable attachment portion 102) while the protruding portion 64 moves within the gap 134 toward the arrow W2 direction since the gap 134 is formed between the protruding portion 64 of the support platform 26 and the hole 124. As illustrated in FIG. 11B, the tongue piece 116C bends so as to absorb the displacement when the amount of relative displacement of the support platform 26 exceeds the gap 134, and stress concentration can be suppressed from acting on the movable attachment portion 102.

In the case of the movable attachment portion 104, the support platform 26 faces in the direction of the support platform 24, namely, faces in a direction inclined to the direction from the hole 124 toward the side wall 34 (the vehicle front-rear direction) (see the arrow Z direction in FIG. 7).

In this case, the protruding portion 64 of the support platform 26 first moves across the gap 134 toward the support platform 24 side. Therefore, stress does not act on the in-built component 14 since the protruding portion 64 does not abut the tongue piece 116C or the tongue piece 116D. Moreover, when the movement amount of the support platform 26 exceeds the gap 134, the tongue piece 116C and the tongue piece 116D bend so as to absorb the displacement, and stress concentration can be suppressed from acting on the movable attachment portion 102.

Thus, in the fuel tank according to the present exemplary embodiment, even when the two movable attachment portions 102, 104 are provided, movement of the protruding portions 64 along straight lines connecting each of the movable attachment portions 102, 104 and the fixed attachment portion 56 is permitted, enabling stress concentration to be suppressed from acting on the movable attachment portions 102, 104, due to the circular gap 134 being provided between the protruding portion 64, and the tongue pieces 116A to 116D that substantially form four quarters of a circle in plan view and the hole 124 formed disposed at the center thereof.

In particular, the tongue pieces 116A to 116D have a shape substantially forming four quarters of a circle, and are disposed around the circumferential direction, enabling deformation in response to displacement in any direction.

The crimping method of the present exemplary embodiment enables crimping in which the head portion of the protruding portion 64 of the support platform 26 is crushed by the crimping jig 126, and formation of the gap 134 between the protruding portion 64 and the tongue pieces 116A to 116D, both occur at the same time. Namely, when the in-built component 14 is attached to the fuel tank main body 12, the gap 134 is formed without additional processing, and stress concentration can be even further suppressed from acting on the in-built component 14 during cooling of the molded article.

Although the movable attachment portion 38 and the fixed attachment portion 56 of the in-built component 14 are disposed on a straight line in the vehicle width direction in the first and second exemplary embodiments, there is no limitation thereto. For example, disposition may be made on a straight line in a freely selected direction such as the vehicle front-rear direction. In such cases, the permitted direction of displacement of the protruding portion 64 by the tongue pieces 48, 92 is preferably on that straight line.

Although explanation has been given in which the movable attachment portion 38, the fixed attachment portion 56, and the in-built component 14 are integrally formed in the first and second exemplary embodiments, the movable attachment portion 38, the fixed attachment portion 56, and the in-built component 14 may be formed as separate bodies, and integrated with one another.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A fuel tank, comprising:
   a fuel tank main body that is made from resin and that stores fuel internally;
   an in-built component installed inside the fuel tank main body;
   a fixed attachment portion that is provided at the in-built component, and that is fixed to the fuel tank main body; and
   a movable attachment portion that is provided at the in-built component,
   wherein the movable attachment portion includes a connecting portion formed with an attachment hole into which an attachment pin protruding from an inner side of the fuel tank, is inserted and anchored,
   wherein the movable attachment portion includes a deformable portion having an end portion abutting or facing the attachment pin, the deformable portion being capable of elastically deforming along an expansion and contraction direction of the fuel tank main body,
   wherein the attachment hole is formed with an oval shaped hole having its length direction along a movement direction of the attachment pin, a first gap being formed between the attachment pin and one wall face of the attachment hole in the movement direction of the attachment pin, and a second gap being formed between the attachment pin and the other wall face of the attachment hole in the movement direction of the attachment pin when in a reference state of the fuel tank main body; and
   wherein a head portion of the attachment pin is crushed, such that the movable attachment portion is anchored to the fuel tank main body in an inserting direction of the attachment pin.

2. The fuel tank of claim 1, wherein the deformable portion is positioned along a direction of movement of the attachment pin accompanying expansion and contraction of the fuel tank main body.

3. The fuel tank of claim 1, wherein the deformable portion is positioned along a vertical plane that intersects both the fixed attachment portion to and the attachment hole of the movable attachment portion.

4. The fuel tank of claim 1, wherein the connecting portion is a rigid body.

* * * * *